US007983985B2

(12) United States Patent
Bloom et al.

(10) Patent No.: US 7,983,985 B2
(45) Date of Patent: *Jul. 19, 2011

(54) BALANCING ARBITRAGABLE TRACKING SECURITIES

(75) Inventors: Steven M. Bloom, Springfield, NJ (US); Michael S. Spector, Washington, DC (US); John L. Jacobs, Columbia, MD (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,856

(22) Filed: Oct. 5, 2010

(65) Prior Publication Data

US 2011/0022511 A1    Jan. 27, 2011

Related U.S. Application Data

(63) Continuation-in-part of application No. 10/001,900, filed on Nov. 14, 2001, now Pat. No. 7,813,992.

(51) Int. Cl.
*G06Q 40/00* (2006.01)
(52) U.S. Cl. ........................ 705/37; 705/36 R
(58) Field of Classification Search ................ 705/37, 705/36 R
See application file for complete search history.

(56) References Cited

U.S. PATENT DOCUMENTS

| | | | |
|---|---|---|---|
| 6,035,287 | A | 3/2000 | Stallaert et al. |
| 6,278,983 | B1 | 8/2001 | Ball |
| 6,879,964 | B2 * | 4/2005 | Sauter et al. .................... 705/37 |
| 6,941,280 | B1 * | 9/2005 | Gastineau et al. .......... 705/36 R |

(Continued)

FOREIGN PATENT DOCUMENTS

WO    WO 01/72106 A2    10/2001

OTHER PUBLICATIONS

Malkiel, Burton G., "Investors Shouldn't Fear 'Spiders'—Exchange-traded funds have some unique advantages and deserve a respected place in the menu of index products." The Asian Wall Street Journal: New York: Jun. 5, 2000, p. 8 (full text) ProQuest (online) (retrieved Aug. 16, 2002).

Damato, Karen, and Lucchetti, Aaron, "Critics Worry About Risks of Exchange-Traded Funds", The Wall Street Journal: New York: Jul. 7, 2000, p. C1 (full text) ProQuest (online) (retrieved Aug. 16, 2002).

Nasdaq-100 Index Tracking Stock, Brochure Sep. 15, 2000.
Nasdaq-100 Index Tracking Stock Specifications Sep. 12, 2000.

(Continued)

*Primary Examiner* — Jagdish N Patel
*Assistant Examiner* — Sara Chandler
(74) *Attorney, Agent, or Firm* — Fish & Richardson P.C.

(57) ABSTRACT

A financial product is based on a first fund that is traded on a trading marketplace in a first country. The financial product is registered in the first country. The first fund has the characteristics of being based on an index of securities that are traded in a second, different country. The first fund is arbitragable with a second fund that is based on the index and which is registered in a second different country. The first fund has a creation unit basis that is substantially the same basis as a creation unit basis for the second fund. The calculation of the net asset value of the first fund occurs at essentially or exactly the same time that second country fund has its NAV calculated. The agent for the first fund has the option of providing or accepting second fund shares or other securities, rather than cash, to cover "cash amount" obligations. Such obligations arise from the need to equate the value received or given for the first fund shares (e.g., the creation unit stock basket plus or minus the "cash amount") with the NAV of the first fund shares that it has issued or received.

19 Claims, 4 Drawing Sheets

U.S. PATENT DOCUMENTS

| | | | |
|---|---|---|---|
| 7,089,205 B1* | 8/2006 | Abernethy | 705/37 |
| 7,099,838 B1* | 8/2006 | Gastineau et al. | 705/35 |
| 7,249,086 B2* | 7/2007 | Bloom et al. | 705/37 |
| 7,461,027 B1* | 12/2008 | Volpert | 705/37 |
| 7,571,130 B2* | 8/2009 | Weber et al. | 705/36 R |
| 7,574,399 B2* | 8/2009 | Weber et al. | 705/37 |
| 7,680,725 B2* | 3/2010 | Bloom et al. | 705/37 |
| 7,689,501 B1* | 3/2010 | Gastineau et al. | 705/37 |
| 7,720,749 B2* | 5/2010 | Sauter et al. | 705/37 |
| 7,747,512 B2* | 6/2010 | Gastineau et al. | 705/37 |
| 7,809,627 B2* | 10/2010 | Bloom et al. | 705/37 |
| 7,813,987 B1* | 10/2010 | Kuhnle et al. | 705/36 R |
| 7,813,992 B2* | 10/2010 | Bloom et al. | 705/37 |
| 7,865,426 B2* | 1/2011 | Volpert | 705/37 |
| 2001/0025266 A1 | 9/2001 | Gastineau | |
| 2002/0091616 A1 | 7/2002 | Bloom et al. | |
| 2002/0128947 A1* | 9/2002 | Sauter et al. | 705/37 |
| 2003/0093350 A1* | 5/2003 | Bloom et al. | 705/36 |
| 2003/0233302 A1* | 12/2003 | Weber et al. | 705/36 |
| 2005/0108146 A1* | 5/2005 | Bond | 705/37 |
| 2005/0187857 A1* | 8/2005 | Tull | 705/37 |
| 2006/0218075 A1* | 9/2006 | Feldman et al. | 705/37 |
| 2006/0277124 A1* | 12/2006 | Gerrietts, II | 705/35 |
| 2007/0106587 A1* | 5/2007 | Orloske et al. | 705/36 R |
| 2007/0112657 A1* | 5/2007 | Huber | 705/35 |
| 2007/0239584 A1* | 10/2007 | Fross et al. | 705/36 R |
| 2008/0040258 A1* | 2/2008 | Weber et al. | 705/37 |
| 2008/0120252 A1* | 5/2008 | Bloom et al. | 705/36 R |
| 2008/0147464 A1* | 6/2008 | Sauter et al. | 705/7 |
| 2009/0024537 A1* | 1/2009 | Eck et al. | 705/36 R |
| 2009/0063366 A1* | 3/2009 | Friedman et al. | 705/36 T |
| 2009/0083196 A1* | 3/2009 | Volpert | 705/36 R |
| 2009/0182683 A1* | 7/2009 | Taylor et al. | 705/36 R |
| 2009/0299908 A1* | 12/2009 | Lindstrom et al. | 705/36 R |
| 2009/0313178 A1* | 12/2009 | Weber et al. | 705/36 R |
| 2010/0174664 A1* | 7/2010 | Kelly et al. | 705/36 R |
| 2010/0262529 A1* | 10/2010 | Bloom et al. | 705/37 |
| 2010/0262565 A1* | 10/2010 | Gastineau et al. | 705/36 R |
| 2011/0022511 A1* | 1/2011 | Bloom et al. | 705/37 |

OTHER PUBLICATIONS

Nasdaq-100 Index Tracking Stock Prospectus Jun. 30, 2000.
Olienyk et al., "Using World Equity Benchmark Shares to Achieve International Diversification", Journal of Financial Planning vl3n6, pp. 98-1, Jun. 13, 2000.
iShares n c Announces Results of Special Shareholders Meetings' Business Wire, Jul. 3, 2000.
iShares n c Announces Estmated Tax Characterstcs of Aug. 31, 2000 DisriLutionsn, Business Wire, 2512, Sep. 7, 2000.
IShares, Inc. Announces Launch of Its New EMU Fund and 'Non-Diversified' Classification of the EMU Fund, Business Wire, 2703, Jul. 27, 2000.
"Barclays Global Investors Continues Expansion of the Largest Worldwide Marketplace of Exchange Traded Funds; New ishares for all of Europe in one investment", Business Wire, 2322, Jul. 27, 2000.
"Barclays Global Investors Begins Expansion of Exchange Traded Fund Offering; ishares Provide the Best of Stocks and Index Funds in One Investment", Business Wire, May 18, 2000.
Barclays Global Investors Launches New Exchange Traded Fund Tracking Taiwan; ishares MSC1 Taiwan is 19th MSC1 Country Managed by BGIn, Business Wire, 0162, Jun. 22, 2000.

* cited by examiner

BALANCING ARBITRAGABLE TRACKING SECURITIES

This application is a continuation-in-part application of application Ser. No. 10/001,900, filed Nov. 14, 2001 now U.S. Pat. No. 7,813,992 entitled "BALANCING ARBITRAGABLE TRACKING SECURITIES"

BACKGROUND

This invention relates to arbitragable trading tracking stocks and the like.

Exchange traded fund shares including various forms of index-tracking stocks exist that are based on indexes such as the Nasdaq-100 Index. The Nasdaq-100 Index tracking stock is traded in the United States under the ticker symbol QQQ. The Nasdaq-100 Index Tracking Stock is registered as a United States investment company.

SUMMARY

According to an aspect of the present invention, a method of producing a financial product that is traded on a first marketplace is provided. The method includes exchanging between a market participant and an agent a creation unit basket of securities for the first fund, for a prescribed number of trading shares in the first fund. The first fund has a basis that is substantially the same basis as a creation unit basis for a second fund that is traded on a second marketplace in a different country than that of the first fund. The method also includes delivering, by either the agent or market participant, a number of shares in the second fund or in other securities to account for any "cash amount" that may be owed between the agent and the participant, as a result of the exchange of the creation unit basket of securities for the shares in the first fund.

According to an additional aspect of the present invention, a computer program product for administrating a financial product that is traded on a first marketplace is provided. The product is based on a creation unit basket of securities having a basis that is substantially the same basis as the creation unit basis for a second fund that is traded on a second marketplace in a different country. The program includes instructions for causing a processor to determine a number of shares in the second fund or number of shares of other securities to account for any "cash amount." The cash amount is an amount that may be owed between the agent and the participant in addition to the prescribed number of shares in the first fund exchanged between the market participant and agent in exchange for the creation unit basket of securities.

One or more aspects of the invention may provide one or more of the following advantages.

The invention provides a mechanism to balance expenses or other cost associated with nonfungible, yet arbitragable shares of exchange traded funds that follow a common investment objective of tracking an index in one country, but are registered in different countries. The invention can be used to account for possible different index component security weightings, different expense ratios, and different impacts of tracking error based on different fund sizes, among other factors, which affect the net asset values (NAVs) of the funds over time. The invention can be used when creating shares in the first fund by delivery of a creation unit basket of stocks or can be used when redeeming shares in the first fund for the creation unit basket of stocks.

Therefore, the invention allows the agent to pay the "cash amount," in whole or in part, in second country fund shares or in other securities, rather than in cash. It also allows the agent to accept second country fund shares or other securities when the participant owes a "cash amount". Further, it allows the agent to replace the "cash amount," in whole or in part, with second country fund shares or other securities, not only for creations of fund shares, but also for redemptions of those shares for the creation unit basket of securities.

This is desirable for several reasons. This helps arbitrage by eliminating or reducing the need to deliver or accept large cash amounts as part of the arbitrage. Further, it reduces the need of the funds and participants to hold large amounts of cash to handle or engage in arbitrage between the two funds, reducing, among other things, tracking error to the target index as a result of a non-negligible portion of the fund assets held as cash, and therefore not invested in index securities. Finally, it enhances fund performance by lowering transaction costs of the fund by reducing the need to convert cash received into securities or securities into cash to accommodate normal creation or redemption activity.

DESCRIPTION

Figure 1:
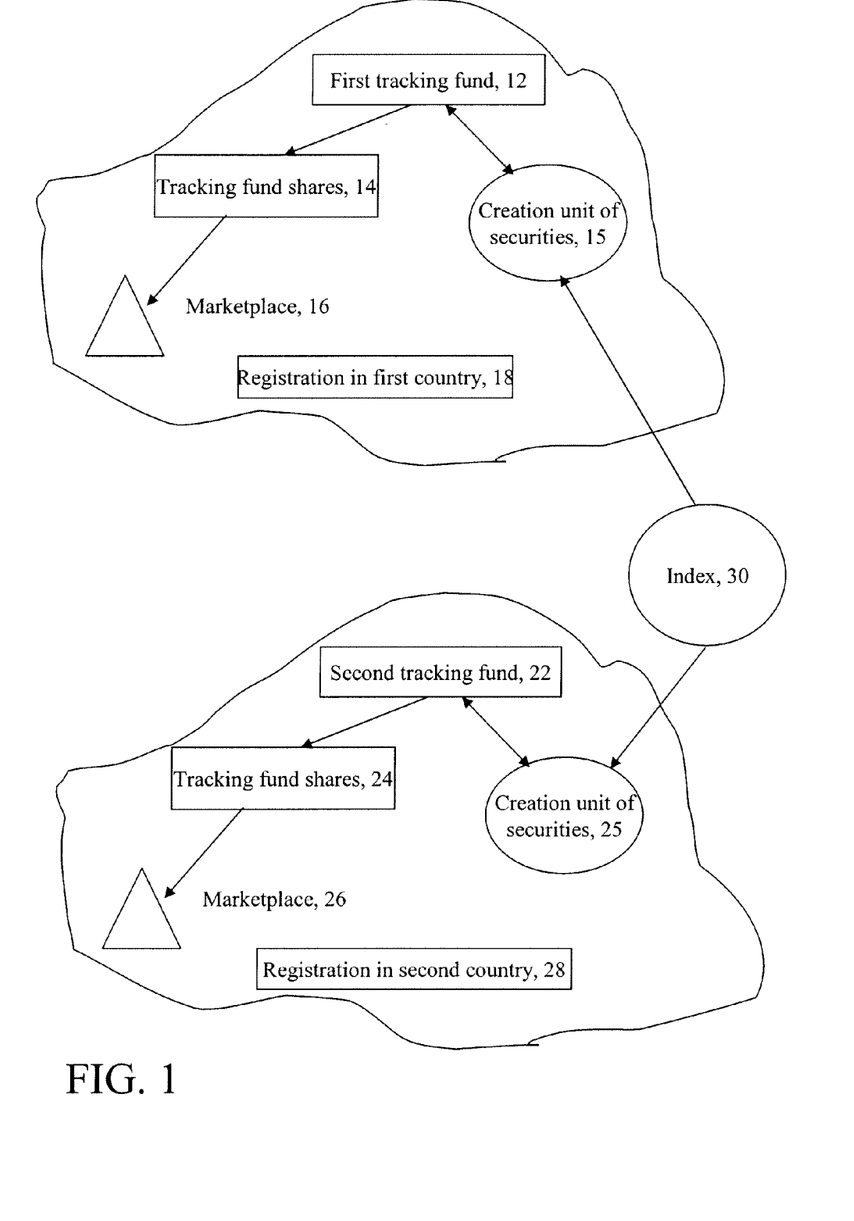
FIG. 1 is a block diagram depicting two investment vehicles that are registered in different countries.

Referring to FIG. 1, a first index-tracking fund 12 issues tracking fund shares 14 that are traded on a marketplace 16 in a first country 18. In addition or as an alternative to being traded on an exchange marketplace, the first index-tracking fund 12 can be traded on an over-the-counter marketplace or through the facilities of an electronic communications network (ECN) or other securities trading marketplace. The first tracking fund 12 has a different country of registration 18 than that of a second fund 22. The second fund 22 also issues tracking fund shares 24 traded on a second marketplace 26. The second marketplace 26 is based in a second country 28. Also, in addition to or as an alternative to trading on an exchange marketplace, trading of the second fund can occur on an over-the-counter marketplace, or through an ECN or other securities trading marketplace.

Both the first tracking fund 12 and the second tracking fund 22 each track a common index 30. One example of an index that the first and second tracking funds could track is the Nasdaq-100 Index. Other examples could include the S&P 500 Index or any other well-known or not so well known index. Requirements of an index-tracking fund are to track or outperform the price and yield performance of a target index.

Depending on the laws or regulations in various countries, the first index-tracking fund 12 can be traded in marketplaces in the first country 18 or in marketplaces in other countries. The first tracking fund shares 14, which are shares of ownership of the first index-tracking fund 12, are not fungible with tracking fund shares 24 of the second fund 22. By being nonfungible is meant that an investor could not buy the shares of the first tracking fund 12 and use those shares to fulfill its delivery obligations with respect to the sale of second tracking fund shares on the second marketplace 26 in the second country 28 or vice-a-versa. The first and second tracking funds 12, 22 are not fungible at the share level 14, 24.

The first tracking fund 12, however, is designed to permit arbitrage of the first tracking fund 12 with respect to the second tracking fund 22 to be as seamless, convenient, and inexpensive, as possible. Arbitrage of the funds promotes maximum liquidity of both the first and the second tracking funds 12, 22. The first tracking fund 12 and the second tracking fund 22 are each based on creation units 15, 25 respectively. To make the first tracking fund 12 arbitragable with the second tracking fund 22, the first tracking fund 12 uses a creation unit 15 basis that is substantially the same as, and preferably essentially identical to, the creation unit 25 basis for the second tracking fund 22. Creation units are specific to exchange traded funds and are known, such as for the Standard & Poors Depository Receipts (SPDRs).

The creation unit is a specific basket of component stocks having a specific quantity of shares for each stock in the basket. Creation of a creation unit number of fund shares involves the delivery of a creation unit basket of such stocks by certain market participants, known as authorized participants, to an agent. In exchange for the delivery of that basket of stocks (plus or minus a "cash amount" as determined daily), the agent, e.g., a bank, trustee, and so forth, receives the delivery, and issues a block of shares in the fund. Conversely, redemption of fund shares involves the delivery of a creation unit basket of such stocks (plus or minus a "cash amount" as determined daily) to the participant upon receipt from that participant of a creation unit number of fund shares.

As an alternative, the agent can transfer to or receive from the market participant an amount of shares of the second country fund (or other securities) in lieu of cash to cover the "cash amount," as will be described in conjunction with FIG. 3. The block of shares in the fund issued in exchange for the delivery of the creation unit of basket corresponds to, e.g., 50,000 shares for each creation unit of stock delivered. Assume in this example that one creation unit of stock equates to 50,000 shares of both the second fund 22 or the first fund 12. The number of fund shares that are provided from a creation unit can be referred to as a "bursting" factor. Other fund share aggregation sizes of creation units are possible. For example, it is not necessary that the number of fund shares attributed to a creation unit be the same for the first fund 12 and the second fund 22. Rather, the number of shares in a creation unit for each fund need only have a defined numerical relationship in order to be used to set a ratio for arbitrage between shares in the two tracking funds.

The composition of the creation unit is based on the index 30 and can be adjusted for various reasons as determined by an agent such as an index receipt agent, trustee, administrator, or other entity designated to perform that function. That composition can change if a stock is added to or deleted from the index 30 or if a share weight change occurs in the index, and so forth. The composition of the creation unit changes because at all times the agent is seeking to define the creation unit package in such a way that it reflects the index 30.

The first fund 12 is set up so that, like the second fund 22, it also has one creation unit equal to 50,000 shares of the first fund 12. That is, the share amounts provided in exchange for the creation units 15 and 25 are respectively equal for first fund 12 and the second fund 22. Other arrangements are possible. All that is required is that there exists a known numerical relationship or ratio between the number of fund shares in a creation unit of the first tracking fund 12 and the number of fund shares in a creation unit of the second tracking fund 22. The identity of the stocks and the share quantities of the stocks in the first country 18 creation unit 15 equal those in the second country 28 creation unit 25. The first fund 12 thus also seeks to track the index 30. In setting up the first fund 12, the composition of its creation unit 15 is defined to rely upon the composition underlying the creation unit 25 for the second fund 22.

Figure 2:
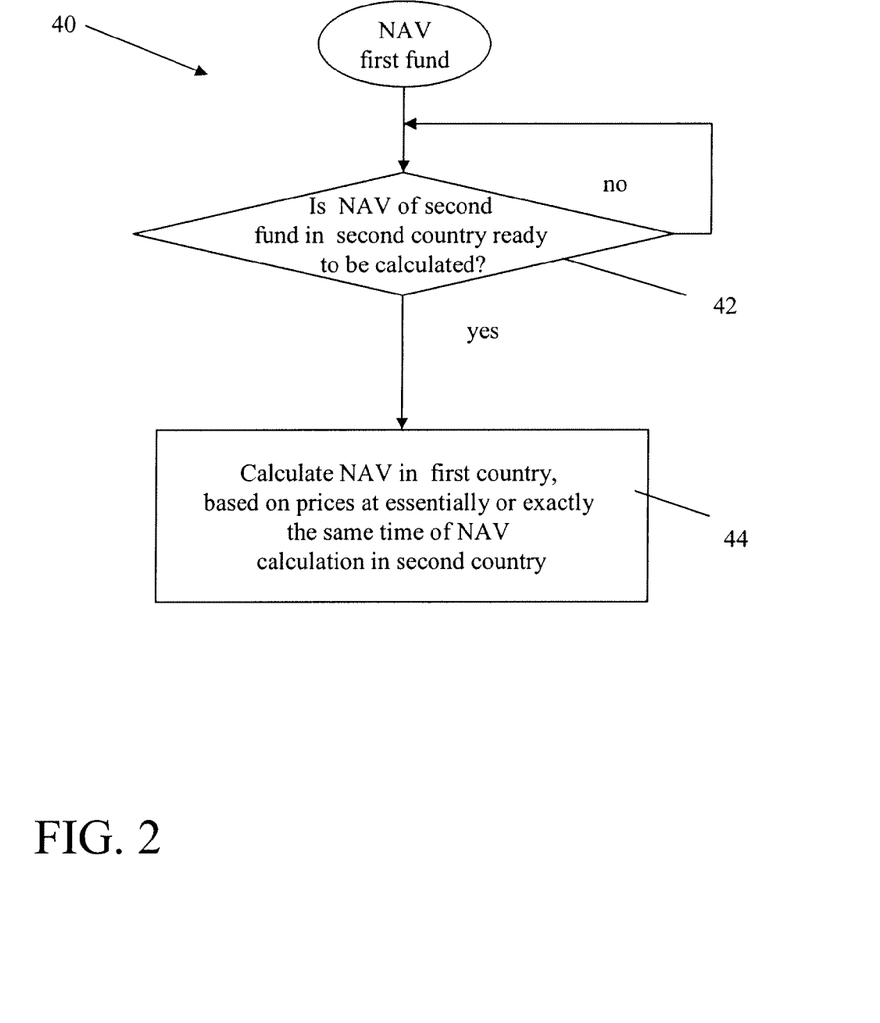
FIG. 2 is a flow chart depicting timing of net asset value calculations for arbitragable funds.

Referring to FIG. 2, mutual funds and the like calculate a net asset value (NAV) 44 periodically, e.g., at least once daily. This calculation generally performed in accordance with the laws and regulations of jurisdictions were the funds are registered. Thus, in the United States the Investment Company Act of 1940 is the basis for jurisdiction over US registered mutual funds. This calculated price is used to redeem and create shares in mutual funds, including, as discussed above, tracking funds. Ordinarily this calculation is performed at the end of each trading day in the country where the fund is traded based on the composition of the fund. For U.S. funds, calculation is performed under provisions of the Investment Company Act of 1940 and subject to applicable rules and guidelines promulgated by the Securities and Exchange Commission (SEC). Essentially, the NAV calculation 44 is performed on a daily basis using closing prices in the regular trading sessions of The Nasdaq Stock Market®, The New York Stock Exchange®, or The American Stock Exchange®, depending on where the security is listed. The calculation is based on pricing at or about 4:00 p.m. each day, New York time. Thus, the second fund 22 has its NAV calculated 44 based upon closing prices each day, which is more or less around 4:00 p.m., New York time.

For the first tracking fund 12, rather than having an NAV calculation performed during or just after trading of the first tracking fund 12 in the country where the first fund 12 is trading, the NAV calculation process 40 for the first fund is programmed with or is determined 42 when the NAV is ready to be calculated for the second tracking fund 22. This calculation is generally performed after the close of trading for the second tracking fund 22 in the second country 28. Thus, at such time that is customary for NAV calculations for the second tracking fund, the NAV is also calculated 44 for the first tracking fund. This approach deviates from a typical practice for a tracking fund in the first country. Normally, the NAV for a fund is calculated at the end of trading in the country of registration and is not synchronized to a NAV calculation in a different country of registration in a different time zone. One of the advantages of calculating the NAV of the first tracking fund 12 at essentially or exactly the same time as calculating the NAV of the second tracking fund 22 is that, together with the equal or numerically related creation units, an arbitrager can trade in the shares of one fund using as a reference the prices or expected prices of the shares of the second fund.

Another benefit occurs in the first country 18 where the first tracking fund 12 is trading. If first tracking shares 14 of the first tracking fund 12 are trading at a sufficient premium in relation to what would objectively be calculated as fair value, and therefore to the price or expected price of the second fund shares, (e.g., the first fund shares 14 are trading at a higher price than the second fund shares 24, which are trading nearer to fair value) there is an opportunity for arbitrage.

An arbitrageur could create and sell 50,000 first fund shares 14 in the first or another country 18 where the shares are trading at a sufficient premium, and could buy at the soonest opportunity on the second marketplace 50,000 second fund shares 24. The arbitrageur thus could sell at a relatively high price and buy at a relatively low price. When the arbitrageur buys the 50,000 second fund shares 24, the arbitrageur will redeem the second fund shares 24 for the stock (plus or minus a "cash amount" tied to the next calculated NAV of the second fund) and deliver that stock (plus or minus a "cash amount" tied to the next calculated NAV of the first fund) to the first fund agent. The delivery covers the arbitrageur's obligations with respect to the issuance for 50,000 first country shares to cover the shares that the arbitrageur had initially sold. The profit is the difference between the sale proceeds of the first country shares and the cost of the purchase of second country shares less transaction costs and plus or minus the difference in associated "cash amounts."

The situation where the first country fund shares are sufficiently undervalued in relation to an objective measurement of fair value works in a similar but opposite way. The arbitrageur could buy 50,000 first fund 12 shares in the first country 18 or other countries, and create and sell 50,000 second fund 22 shares at the soonest opportunity of trading in the second country 28. When the arbitrageur buys the 50,000 first fund 12 shares in the first or other countries 18, the arbitrageur could redeem those fund shares for stock (plus or minus a first fund "cash amount" as referred to above). The arbitrageur could arrange to deliver the stock to the second country agent, bank, trustee, etc., plus or minus the applicable "cash amount" for the second fund. The arbitrageur can request creation of a creation unit of second fund shares to cover its obligations with respect to the 50,000 second fund 22 shares, which it created and sold on the second country 28 marketplace. Any profit is measured as the proceeds from the sale of second fund 22 shares on the second country 28 marketplace minus the cost of the purchase of the 50,000 first fund 12 shares in the first or other countries 18, less any transaction cost and plus or minus the difference in associated "cash amounts."

The timing when the NAV calculation is performed enhances arbitrage between the two different funds. When a creation unit for such types of funds is produced, the producer delivers to or receives from the agent the stock composition and cash or if during a redemption, the redeemer is paid or gives cash (both referred to as "cash amount") so that the closing value of the stock basket plus or minus the cash equals on a creation unit basis the next calculated NAV for 50,000 second or first fund shares. The concurrence of NAV calculation limits differences in this "cash amount," some of which would arise if the NAV calculations were performed at different times and therefore based upon different stock prices.

In the United States, under the Investment Company Act of 1940, when an investor subscribes for or redeems shares of an investment company, the transaction must be valued at the next calculated (NAV) for the investment company. In effect, the creation of 50,000 second fund shares 24 is effected through the delivery of the basket of stocks in the creation unit 25 of the second fund 22, plus or minus a "cash amount." The "cash amount" is determined each day so that the closing value of the stock basket plus or minus the "cash amount" equates to the NAV of 50,000 second fund shares 24, when the NAV is calculated at the close of trading in the second country 28.

If an investor were not required to come in or out of the fund at the NAV of the fund shares issued, then an investor could receive 50,000 newly issued second fund shares 24 while paying less than the current NAV associated with the previously issued second fund shares 24, which would dilute the value of the second fund 22. This requirement, under the Investment Company Act of 1940, that an investor come in or out of the fund at the closing NAV protects shareholder value. The NAV is calculated for the second fund 22 based on prices at the close of trading in the second country 28.

The first fund 12, which is registered and/or traded in the first or other countries 18 is also designed such that the basket of stocks in the creation unit 15 of the first fund 12 (plus or minus the "cash amount") equates to the NAV of 50,000 first fund shares 14. To accomplish this, the first fund calculates the NAV of the first fund 12 at substantially the same time, and preferably exactly the same time, that the NAV of the second fund 22 is calculated, to eliminate or reduce differences in the "cash amounts."

Some funds in some countries, e.g., the United States, require redemption or creation of fund shares to occur primarily through in-kind creation or redemption only. In other words, in such funds in these countries there typically cannot be a cash subscription (creation) or redemption with the fund. The laws or regulations in the first country 18 or other countries may be different. For example, the laws of the first country 18 may provide for in-kind purchases/redemptions with the fund and/or permit cash purchases/redemptions with the fund.

A cash purchase or redemption can be subject to a minimum subscription amount, e.g., 100,000 dollars U.S., whereas the creation unit for second country shares 24 could be established at a much higher amount, e.g., 5 million dollars U.S. In other words, it is possible that in the first country or other countries, a smaller "partial" creation unit can be purchased or redeemed by delivering or accepting $100,000 cash rather than dealing in-kind with the actual stocks associated with a full creation unit.

The combination of these attributes of the design of the first fund product 12 permits maximum arbitrage possibilities between the first fund product 12 and the second fund product 22. This occurs even though the first fund product 12 and the second fund product 22 are separate registrations and ordinarily are not fungible at the share level, and therefore are not readily arbitragable. Thus, setting the creation unit 15 of the first fund 12 to be equal to or have a fixed numerical relationship or ratio to the creation unit 25 of the second fund 22 (the primary market creation unit), and/or by calculating the NAV for the first fund 12 at or near the same time that the second (primary market) fund 22 calculates its NAV enables the first fund 12 to be highly arbitragable with the second fund 22. The second country 28 is not only the primary market for the second fund 22, but is also the primary market for the underlying securities in the index 30 upon which the first fund 12 and the second fund 22 are based.

These features of a fixed relationship between creation units and simultaneous or proximate NAV calculations enable direct arbitrage of otherwise unlike, i.e., nonfungible, securities. The features provide a mechanism for the exportation or importation of any exchange traded fund from one country out of or into any other country.

Figure 3:
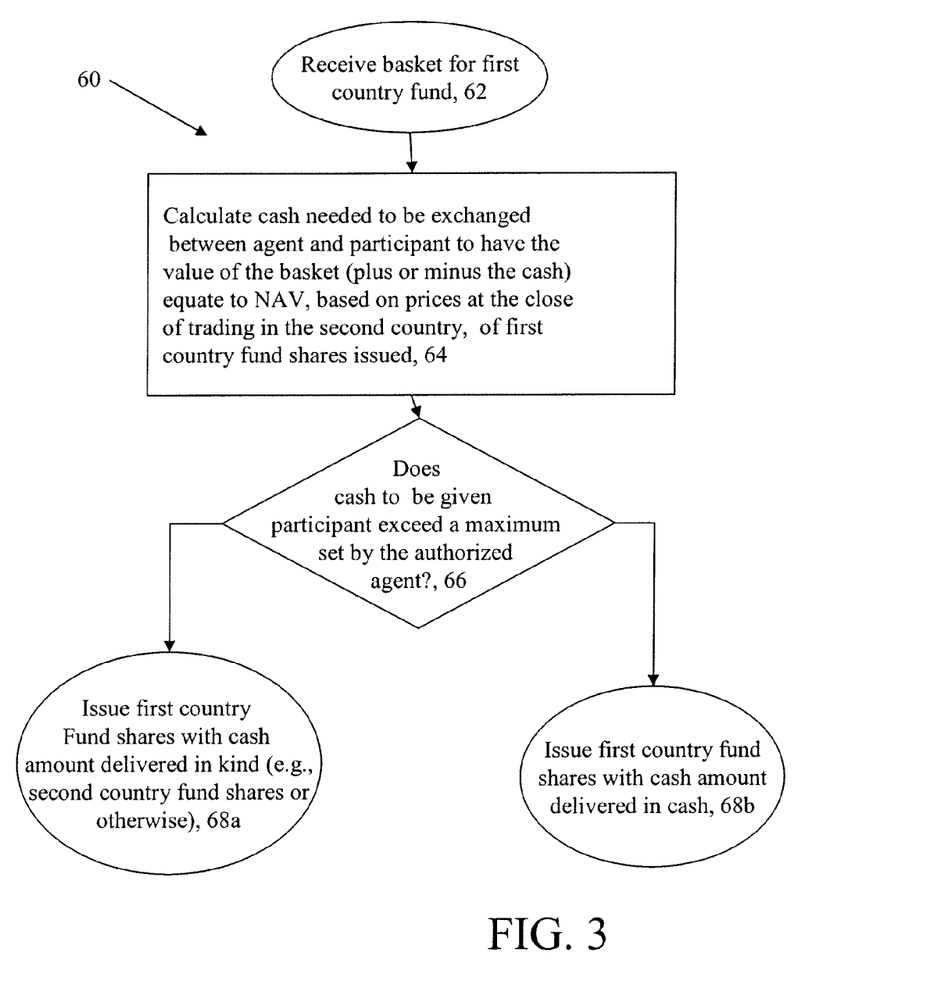
FIG. 3 is a flow chart that depicts a process to facilitate arbitrage by allowing fund shares to be used in lieu of cash to eliminate differences between the NAV of a creation unit number of first country fund shares and second country fund shares.

Referring to FIG. 3, to create shares in the first fund 12 an agent receives 62 from a market participant the basket of securities for a creation unit 15 of the first country fund, as described above. The agent exchanges the basket of securities for a prescribed number of first fund shares 14. As part of the exchange, the agent calculates 64 the amount of cash needed to be exchanged between agent and the participant to have the basket and the "cash amount" equate to the NAV of the first fund shares 14 based on prices at the close of trading in the second country.

If the value of the basket of securities is greater than the NAV of the first fund shares 14 to be delivered, the agent owes cash to the participant. Conversely, if the value of the basket of securities is less than the NAV of the first fund shares 14 to be delivered, the participant owes cash to the agent.

As shown in FIG. 3, if the calculation 64 indicates that the agent that issues the first fund shares must also issue cash to the market participant 66, the agent at its option can instead issue 68a first fund shares with the "cash amount" that it must deliver wholly or partially of second fund shares 24 or other securities (e.g., shares in companies in the basket). Similarly, if the calculation 64 indicates that the agent that issues the first fund shares 14 is to receive cash from the market participant, the agent at its option can require that the participant deliver second fund shares 24 or other securities along with the basket. In either case, a small amount of cash may be required to be exchanged in either direction to ensure that the basket of securities deposited by the participant plus or minus the second country shares 24 (or other securities) and that amount of cash, equates to the NAV of the first fund shares 14 issued. This provides an additional feature that further enhances the ability to perform such arbitrage, as well as providing additional benefits to the fund and market participants.

The agent can set a maximum amount of cash that it will give to or receive from participants. Any transactions with "cash amounts" exceeding this amount will result in the "cash amount" being wholly or partially paid (either by the participant to the agent or by the agent to the participant depending upon which owes the "cash amount") in second country fund shares 24 (or other securities), possibly plus or minus a small cash sum. If this option is not exercised, then the agent can simply issue 68b first country fund shares with the "cash amount" paid or received solely in cash.

This aspect is significant because it enables more precise arbitrage with respect to the first fund, both between the first fund and the second fund and between the first fund and the underlying stock basket. In some implementations, it allows the agent and the participant to know exactly what the deliverable securities, including both the creation unit stock and in-kind "cash amount" stock will be. Further, in some embodiments, this mechanism can also be used to minimize "cash drag" and transaction costs of the fund as it reduces the amount of cash held or received by the fund, which cash either provides a cash drag or creates transaction costs as the cash is used to purchase shares. It holds a similar benefit for the participant, as the participant needs to deliver or receive less cash in its creation or redemption activity.

Figure 4:
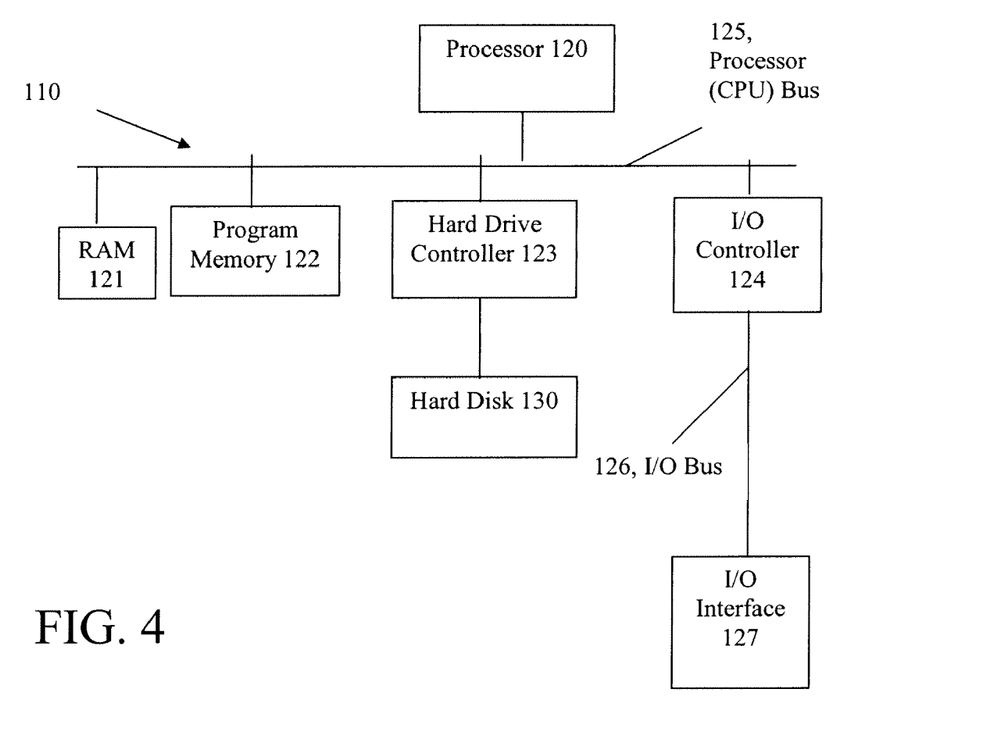
FIG. 4 is a block diagram of a computer system.

The invention can be implemented in digital electronic circuitry, or in computer hardware, firmware, software, or in combinations thereof. Additionally, aspects of the invention can be implemented manually. For example, the calculations of the NAV for the first fund and the second fund can occur in systems 110 as shown in FIG. 4. Also, aspects of the calculations of whether to dispense cash or second fund shares 24 (or other securities) when the fund has received a basket of securities can occur in systems as in FIG. 4. Generation of creation units can be implemented using any technique commonly employed for such funds taking into consideration the option of the agent to provide or accept second country fund shares (or other securities) in lieu of cash. Also, data structures can be used to represent the first fund shares. These data structures (not shown) can be stored in memory and in persistence storage. The first fund shares can be represented by certificates or as book entries in the records of an administrator or broker/dealer either as manual or computer entries.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks, removable disks, magneto-optical disks, and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer is shown in FIG. 4, which shows a block diagram of a programmable processing system (system) 110 suitable for implementing or performing the apparatus or methods of the invention. The system 110 includes a processor 120, a random access memory (RAM) 121, a program memory 122 (for example, a writeable read-only memory (ROM) such as a flash ROM), a hard drive controller 123, and an input/output (I/O) controller 124 coupled by a processor (CPU) bus 125. The system 110 can be preprogrammed, in ROM, for example, or programmed (and reprogrammed) by loading a program from another source (for example, from a floppy disk, a CD-ROM, or another computer).

The hard drive controller 123 is coupled to a hard disk 130 suitable for storing executable computer programs, including programs embodying the present invention, and data including storage. The I/O controller 124 is coupled by an I/O bus 126 by an I/O interface 127. The I/O interface 127 receives and transmits data in analog or digital form over communication links such as a serial link, local area network, wireless link, and parallel link.

Other embodiments are within the scope of the appended claims. For example, the invention works in a similar fashion when a participant seeks to redeem first fund shares 14 in exchange for the basket of securities. If the NAV of the first fund shares 14 redeemed is greater than the value of the basket of securities, the agent owes cash to the participant. If the NAV of the first fund shares 14 redeemed is lesser than the value of the basket of securities, the participant owes cash to the agent. As in the creation process, the agent can, instead of cash, deliver or receive some or the entire "cash amount" in the form of second fund shares 24 or other securities. This can be either required or at the option of either the participant or the agent. As with creations, a small amount of cash may be required to be exchanged in either direction. This cash would make sure that the basket of securities paid to the participant plus or minus the "cash amount," and the second country shares 24 (or other securities) and the appropriate amount of cash, equates to the NAV of the first fund shares 14 received.

What is claimed is:
1. A method, comprising:
recording by one or more computers receipt of a creation unit basket of securities for a first fund for a prescribed number of shares in the first fund;

calculating by the one or more computers an amount of cash needed to be exchanged to have the creation unit basket of securities for the first fund and the calculated cash amount equate to the net asset value of a second fund based on prices at the close of trading in securities that comprise a creation unit basket for the second fund, with the creation unit basket of securities for the first fund being substantially the same as the creation unit basket of securities for the second fund; and recording delivery of a number of shares in the second fund or in securities other than shares in the first fund to account for the calculated cash amount as a result of the receipt of the creation unit basket of securities for the first fund for the shares in the first fund.

2. The method of claim 1, wherein the first fund is traded in a first country and the second fund is traded in a second, different country, and calculating is performed at the close of trading of securities in the second country to equate to the values of the creation unit baskets.

3. The method of claim 2 wherein when the cash amount is a negative amount, the one or more computers that issue the shares in the first fund records delivery of shares in the second fund or the other securities in lieu of the cash amount, and when the cash amount is a positive amount the one or more computers that issues the shares in the first fund records an acceptance of the shares in the second fund shares or the other securities in lieu of cash amount.

4. The method of claim 2, further comprising:
recording by the one or more computers the cash amount.

5. The method of claim 2 wherein an agent that issues the shares in the first fund sets a maximum amount of cash to deliver to a participant or receive from a participant with respect to the calculated cash amount.

6. The method of claim 5 wherein transactions that exceed the maximum amount will result in issuance or receipt of the shares in the second fund or the other securities, along with the prescribed number of shares in the first fund.

7. A computer program product tangibly stored on a computer readable storage device for administrating a financial product the computer program product comprising instructions to cause a computer to:

record receipt of a creation unit basket of securities for a first fund for a prescribed number of shares in a first fund;

determine an amount of cash needed to be exchanged to have the creation unit basket of securities for the first fund and the cash amount equate to the net asset value of a second fund based on prices at the close of trading in securities that comprise a creation unit basket for the second fund, with the creation unit basket of securities for the first fund being substantially the same as the creation unit basket of securities for the second fund;

record delivery of a number of shares in the second fund or in securities other than the shares the first fund to account for the cash amount as a result of the receipt of the creation unit basket of securities for the first fund for shares in the first fund.

8. The computer program product of claim 7, wherein the first fund is traded in a first country and the second fund is traded in a second, different country, and the computer program further comprises instructions to:

calculate the net asset value of the first fund using prices for the securities in the creation unit basket at the close of trading in the second country in which the second fund is traded, to equate to the values of the creation units.

9. The computer program product of claim 8 wherein when the cash amount is a negative amount, an agent issues shares in the second fund or provides securities other than the first fund securities in lieu of the cash amount, and when the cash amount is a positive amount the agent accepts shares in the second fund shares or the other securities other than shares in the first fund in lieu of cash amount.

10. The computer program product of claim 8 further comprising instructions to:

calculate a small amount of cash to exchange to equate the creation unit basket for the first fund plus or minus the shares in the second fund or the other securities to cover the cash amount with the creation unit for the second fund.

11. The computer program product of claim 8 further comprising instructions to:

determine whether transactions exceed a maximum cash amount, and record either the issuance of or receipt of shares in the second fund or the other securities along with exchange of the prescribed number of shares in the first fund.

12. The computer program product of claim 7, further comprising instructions to:

record the cash amount.

13. The computer program product of claim 7 further comprising instructions to:

determine whether an agent that issues shares in the first fund has set a maximum amount of cash to deliver to a participant or receive from a participant with respect to the calculated cash amount exchanged between the agent and the participant.

14. A computer system for administrating a financial, comprises:

a processor:

a memory; and a storage device that stores a program for execution by the processor using the memory, the program comprising instructions for causing the processor to:

record receipt of a creation unit basket of securities for a first fund for a prescribed number of shares in a first fund;

determine an amount of cash needed to be exchanged to have the creation unit basket of securities for the first fund and the cash amount equate to the net asset value of a second fund based on prices at the close of trading in securities that comprise a creation unit basket for the second fund, with the creation unit basket of securities for the first fund being substantially the same as the creation unit basket of securities for the second fund;

record delivery of a number of shares in the second fund or in securities other than shares in the first fund to account for the cash amount as a result of the receipt of the creation unit basket of securities for the shares in the first fund.

15. The computer system of claim 14 wherein the first fund is traded in a first country and the second fund is traded in a second, different country, and instructions to calculate use prices for the securities in the creation unit basket at the close of trading in the second country in which the second fund is traded, to equate to the values of the creation unit baskets.

16. The computer program product of claim 13 wherein transactions that exceed the maximum amount will result in issuance or receipt of the shares in the second fund or the other securities, along with the prescribed number of shares in the first fund.

17. The computer system of claim 14 wherein the computer program product of further comprises instructions to:

record the cash amount.

18. The computer system of claim 14 wherein the computer program product of further comprises instructions to:

determine whether an agent that issues the shares in the first fund has set a maximum amount of cash to deliver to a participant or receive from a participant with respect to the calculated cash amount to be exchanged between the agent and the participant.

19. The computer system of claim 18 wherein transactions that exceed the maximum amount will result in issuance or receipt of the shares in the second fund or the other securities, along with the prescribed number of shares in the first fund.

* * * * *